Oct. 27, 1964 W. E. STREETER 3,154,130
PIPE FLARING TOOL
Filed June 26, 1959 2 Sheets-Sheet 1

INVENTOR.
WALTER E. STREETER
BY
Charles L. Lorenbeck
attx

Oct. 27, 1964  W. E. STREETER  3,154,130
PIPE FLARING TOOL
Filed June 26, 1959  2 Sheets-Sheet 2

INVENTOR.
WALTER E. STREETER
BY
Charles L. Lovenbeck
ATTORNEY

3,154,130
PIPE FLARING TOOL
Walter E. Streeter, 4622 Sunnydale Blvd., Erie, Pa.
Filed June 26, 1959, Ser. No. 823,071
1 Claim. (Cl. 153—21)

This invention relates to machines and methods for forming branches on pipes and the like having side outlets to accommodate a plumbing system, including a central arterial pipe and one or more tributary lines.

While certain aspects of the primary inventive concept may be generally applicable to various pipes formed of a wide variety of materials and useful in numerous arts, the invention as herein set forth in one of its preferred embodiments is directed to sanitary plumbing constructions in which the fingers are characterized by the absence of any internally protruding surface facings against the direction of drainage flow, thus providing a sweeping juncture between the passageways so as to preclude steps, recesses, pockets, or traps by which fluids and solid materials entrained thereby may be detained to form obstructions.

Previous machines for forming branches on pipes have been complicated and difficult to use and were not suitable for use in forming fittings on large pipes. The present invention contemplates, in combination, the use of a machine wherein a hole saw is mounted for forming a hole in a plumbing line. With the machine clamped over the pipe after the hole is sawed, a finger is extended through the sawed hole and a rotatable member is attached to the finger for rotating the finger to draw or spin a flange on the pipe itself. The finger can be inserted into the hole and into the machine after the machine itself is in position and the hole has been sawed. The threaded lift sleeve with the bearing member therein which supports the finger makes it possible to readily assemble the hole saw and quickly remove it and insert the finger after the hole is sawed. The present invention lends itself to the forming of flanges on tubing made of non-ferrous material such as brass, aluminum, copper, and the like and is especially suitable for forming flanges on large tubing of heavy wall thicknesses.

It is, accordingly, an object of the present invention to provide an improved tool for forming flanges on tubing and, more particularly, it is an object to provide a tool which is simple in construction, economical to manufacture, and simple and efficient to use.

Another object of the invention is to provide an improved tool for forming flanges on tubing.

With the above and other objects in view, the present invention consists of the combination and arrangement hereinafter more fully described, illustrated in the accompanying drawings and more particularly pointed out in the appended claim, it being understood that changes may be made in the form, size, proportions, and minor details of construction without departing from the spirit or sacrificing any of the advantages of the invention.

Figure 5:
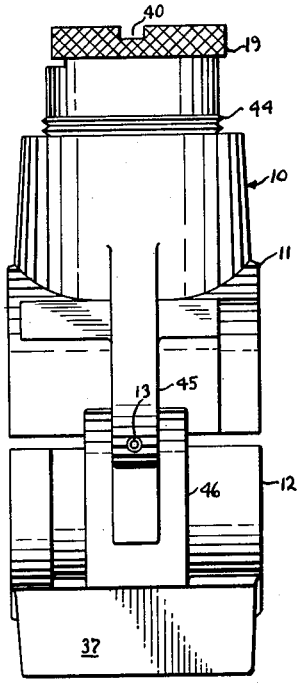
FIG. 5 is a side view of the tool shown in FIG. 4.

Now with more particular reference to the drawings, a spinning tool 10 is shown having an upper body casting 11 and a lower body casting 12. The upper body casting 11 is hinged to the lower casting 12 by means of a hinge pin 25. The pin 25 extends through a bore in the upper casting 11 and a similar bore through ears 46 of the lower casting 12. The pin 25 is held in place by means of a set screw 13 which extends through a hole in an ear 45 and engages the pin 25. The ear 45 on the upper casting 11 is disposed between the ears 46 on the lower casting 12 as shown in FIG. 5 and forms a swingable connection for connecting the castings 11 and 12.

Figure 4:
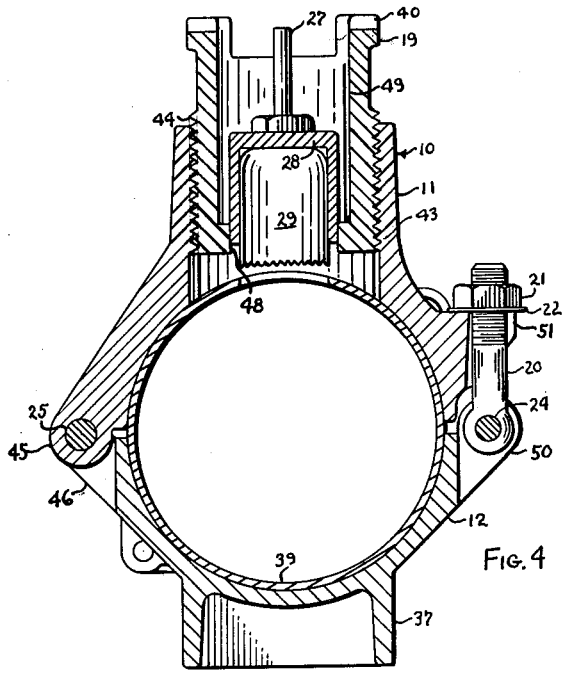
FIG. 4 is a view similar to FIG. 1 showing the hole saw in place in the tool for cutting a hole in the tube instead of the spinning tool.

The upper casting 11 has a boss extending upwardly therefrom which has a threaded bore 43 therein. The bore 43 threadably receives a sleeve lift 19 which is externally threaded at 44 to threadably engage with the bore 43 of the boss. The sleeve lift 19 is bored at 48 to receive a hole saw drill holder 28 which is cup shaped and receives a hole saw 29. The holder 28 is freely rotatable as shown in FIG. 4 and has an opening at 49 to receive a bearing member 18. The bearing member 18 is freely rotatable in the opening 49 and is used for the spinning operation.

Figure 1:
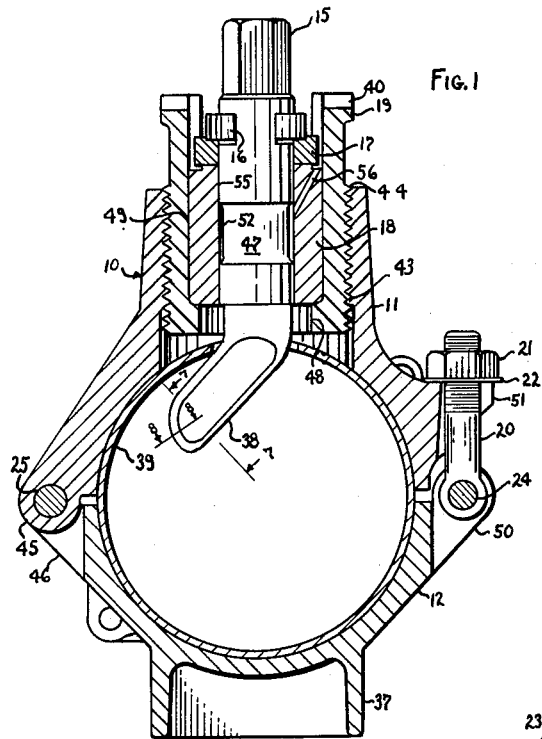
FIG. 1 is a cross sectional view of a tool according to the invention with the handle removed and taken on line 1—1 of FIG. 2.
Figure 3:
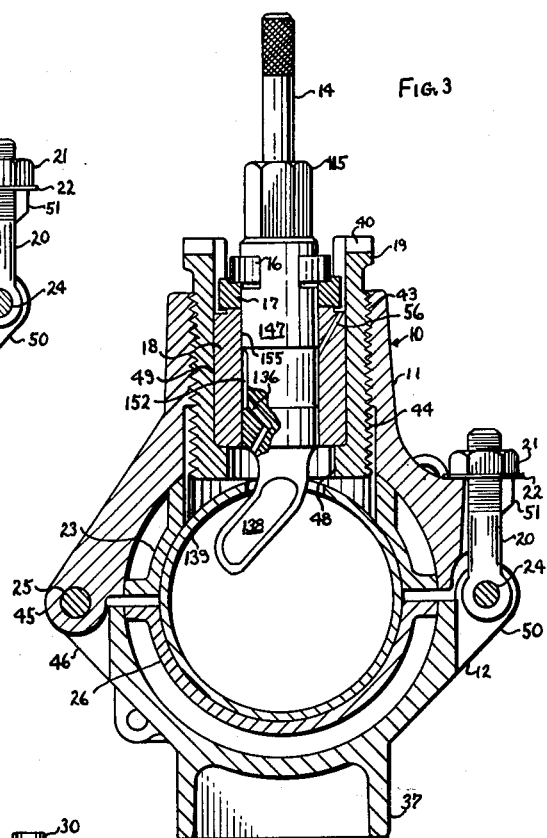
FIG. 3 is a longitudinal cross sectional view of the tool having a spinning finger for flaring a different size of tube.
Figure 2:
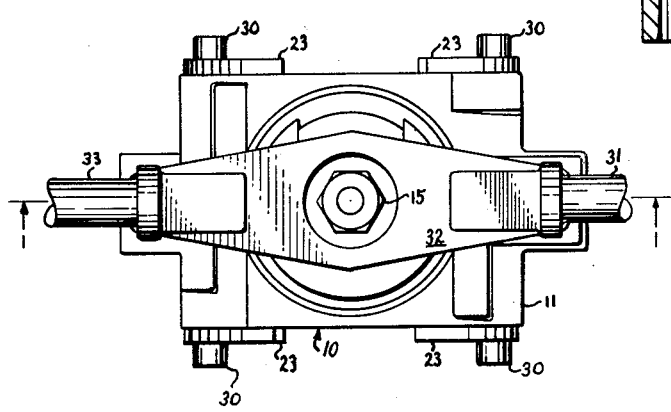
FIG. 2 is a top view of the tool.
Figure 6:
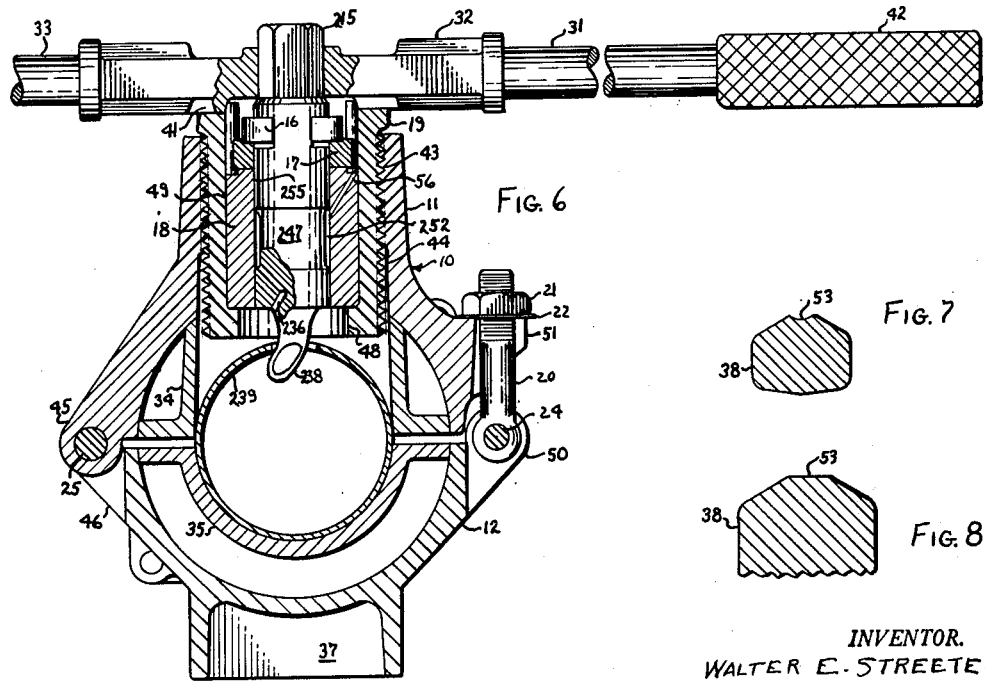
FIG. 6 is a view of the tool set up to form a flange on a small tubing.

It will be noted that the saw 29 shown in FIG. 4 has been replaced by a spinning tool 47, 147, and 247 in FIGS. 1, 3, and 6, respectively.

The bearing member 18 rests in the opening 49 and is supported on the lower shoulder thereof. A spinning tool 38 extends through the sawed hole in the tube as shown. The hole saw 29 has the drill holder 28 receiving it as shown and a drill arbor 27 is attached to the upper end of the drill holder 28 and extends out through the upper end of the sleeve lift 19 as shown.

During operation, the upper casting 11 and the lower casting 12 are suppotred around the tube 39 as shown in the various figures with the bore 48 supported over the spot where a flange fitting is desired to be formed. The upper casting 11 and the lower casting 12 are swung together around the hinge pin 25 and the two castings 11 and 12 are locked together by an eye bolt 20. The eye bolt 20 is pivoted to ears 50 by means of a hinge pin 24 which extends through a hole in the ears and into the eye in the eye bolt 20. The upper end of the eye bolt 20 is threaded to receive a nut 21 which is supported on a washer 22. The washer 22 is supported on top of projecting bifurcated members 51 which extend outwardly on either side of the eye bolt 20.

Then the hole saw 29 is inserted through the bore 48 and an electric drill or other rotating means is attached to the arbor 27 and a hole of a size determined by the size of the flange to be spun and by the size of saw used is sawed. Then, depending on the size of fitting to be made, a finger or spinning tool such as 38, 138, or 238 may be put through the hole and handles 31 and 33 having a wrench body 32 with handle grips 42 thereon can be attached to a turn bolt 15. The turn bolts 15, 115, or 215 is interconnected to the spinning tools or shafts 47, 147, or 247 which are in turn connected to the corresponding finger as shown. The shafts 47, 147, and 247 fit into a bore 55 of the bearing member 18. The wrench handles 31 and 33 may then be rotated.

As the handle grips 42 are rotated, the finger 38 will be rotated and the material around the hole sawed in the tube will be pulled upwardly. Then as the material is pulled upwardly, the wrench body 32 may be lowered to bring a key 41 into a keyway 40 and the sleeve lift 19 is thereby rotated, screwing it upwards in the threaded bore 43. This can be progressively continued and, at the same time, the handle grips 42 may be rotated so that the part of the material around the opening sawed in the tube will be progressively spun outwardly.

The wrench body 32 has the keys 41 thereon received in the keyways 40. A collar 17 is disposed around the shaft 47 and is held in place thereon by means of a C-washer 16 which is snapped into a groove in the upper end of the shaft 47. A guide pin 14 is attached to the turn bolt 115 as shown and adapter plates 23 having the proper internal radii are held to the bodies of the castings 11 and 12 by means of cap screws 30.

In order for the tool to be used with various sizes of tubing, the adapter plates 23 for use with a smaller size tubing, for example, three inch tubes, are indicated at 26 in FIG. 3. It will be seen that they have an internal flange surface radius to conform to the outer periphery of a tubing 139 and are indicated at 23 and 26. The tool is shown in FIG. 1 without adapter plates for the larger size of the tube 39 and is shown with adapter plates 34 and 35 in FIG. 6 which are suitable for a smaller size tubing.

The shafts 47, 147, and 247 are provided with oil holes 36, 136, and 236 for lubricating the fingers, the oil being put into peripheral grooves 52, 152, and 252 from an oil hole 56 in the bearing member 18 and dripping down through the holes 36, 136, and 236 onto the surfaces of the fingers.

The lower casting 12 is provided with a flat base 37 so that the device can be conveniently set onto a table or put into a vise. The base casting is cored to the center to make it light.

Figure 7:
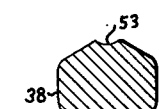
FIG. 7 is a cross sectional view taken on line 7—7 of FIG. 1.
Figure 8:
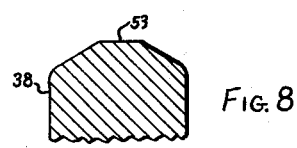
FIG. 8 is a cross sectional view taken on line 8—8 of FIG. 1.

In FIGS. 7 and 8, the cross section of the finger is shown wherein serrations 53 form paths for the oil from the hole 36 to flow.

The foregoing specification sets forth the invention in its preferred practical forms but the structure shown is capable of modification within a range of equivalents without departing from the invention which is to be understood is broadly novel as is commensurate with the appended claim.

The embodiments of the invention in which an exclusive property or privilege is claimed are defined as follows:

A tool for spinning a flange on a tubing comprising a body casting for supporting around a tubing, a threaded bore in one side of said casting, a threaded sleeve lift threadably received in said bore, said sleeve lift having an axial bore therein and a counterbore defining a shoulder, said axial bore being adapted to receive a hole saw for sawing a hole in said tubing, said threaded sleeve lift counterbore further being adapted to receive a bearing member having a bore, said bearing member having a shaft rotatably received in its said bore, and a finger extending laterally and downwardly through said bearing member bore from the lower end of said shaft, said finger being adapted to underlie the material of a pipe to be flanged around said shaft and to move outwardly whereby said finger moves said material of said pipe outwardly as said sleeve lift is moved outwardly and as said shaft rotates, said bearing member having an oil hole extending from the top downwardly, said finger having oil grooves on the upper side thereof, said shaft having a C-washer disposed in a groove in the upper end thereof, said C-washer overlying said bearing member and forming a bearing surface thereof for supporting said shaft as said sleeve lift is rotated to move it upwardly.

References Cited in the file of this patent

UNITED STATES PATENTS

| | | |
|---|---|---|
| 827,800 | Gerzabek et al. | Aug. 7, 1906 |
| 1,468,662 | Gifford | Sept. 25, 1923 |
| 1,476,756 | Junkers | Dec. 11, 1923 |
| 1,765,704 | Schultis | June 24, 1930 |
| 1,855,602 | Kerner | Apr. 26, 1932 |
| 1,978,430 | Kipnis | Oct. 30, 1934 |
| 2,200,662 | Welch | May 14, 1940 |
| 2,524,420 | Blampin | Oct. 3, 1950 |
| 2,736,949 | Kraemer | Mar. 6, 1956 |
| 2,787,050 | Markel | Apr. 2, 1957 |
| 2,819,697 | Kraemer | Jan. 14, 1958 |
| 2,910,897 | Huet | Nov. 3, 1959 |
| 2,962,079 | Wilson | Nov. 29, 1960 |
| 3,050,102 | Hock | Aug. 21, 1962 |

FOREIGN PATENTS

| | | |
|---|---|---|
| 541,263 | France | Sept. 17, 1921 |
| 671,275 | Great Britain | Apr. 30, 1952 |